United States Patent
Callahan

(10) Patent No.: US 9,369,724 B2
(45) Date of Patent: Jun. 14, 2016

(54) DECODING AND SYNTHESIZING FRAMES FOR INCOMPLETE VIDEO DATA

(71) Applicant: Microsoft Technology Licensing, LLC, Redmond, WA (US)

(72) Inventor: Sean Callahan, White Bear Lake, MN (US)

(73) Assignee: Microsoft Technology Licensing, LLC, Redmond, WA (US)

(*) Notice: Subject to any disclaimer, the term of this patent is extended or adjusted under 35 U.S.C. 154(b) by 37 days.

(21) Appl. No.: 14/231,228

(22) Filed: Mar. 31, 2014

(65) Prior Publication Data

US 2015/0281712 A1  Oct. 1, 2015

(51) Int. Cl.

| | |
|---|---|
| *G06K 9/36* | (2006.01) |
| *G06K 9/46* | (2006.01) |
| *H04N 19/42* | (2014.01) |
| *H04N 19/89* | (2014.01) |
| *H04N 19/174* | (2014.01) |
| *H04N 19/44* | (2014.01) |
| *H04N 19/65* | (2014.01) |
| *H04N 19/895* | (2014.01) |

(52) U.S. Cl.
CPC ............ *H04N 19/42* (2014.11); *H04N 19/174* (2014.11); *H04N 19/44* (2014.11); *H04N 19/65* (2014.11); *H04N 19/89* (2014.11); *H04N 19/895* (2014.11)

(58) Field of Classification Search
None
See application file for complete search history.

(56) References Cited

U.S. PATENT DOCUMENTS

| | | | | |
|---|---|---|---|---|
| 5,724,369 | A * | 3/1998 | Brailean | H04N 19/51 348/616 |
| 6,104,757 | A * | 8/2000 | Rhee | H04B 1/66 375/240.12 |
| 6,289,054 | B1 * | 9/2001 | Rhee | H04B 1/66 375/240.12 |
| 6,557,001 | B1 * | 4/2003 | Dvir | H04N 21/4126 |
| 7,092,365 | B1 | 8/2006 | Tackin et al. | |
| 7,359,409 | B2 | 4/2008 | Li | |
| 2002/0041339 | A1 * | 4/2002 | Diepold | G06T 7/20 348/700 |
| 2010/0189182 | A1 | 7/2010 | Hannuksela | |
| 2012/0170658 | A1 | 7/2012 | Anderson et al. | |
| 2014/0341307 | A1 * | 11/2014 | Barak | H04N 19/176 375/240.27 |

FOREIGN PATENT DOCUMENTS

| | | |
|---|---|---|
| EP | 2096874 A1 | 9/2009 |
| EP | 2405661 A1 | 1/2012 |

OTHER PUBLICATIONS

Ascenso, et al., "Packet-header Based No-Reference Quality Metrics for H.264/AVC Video Transmission", In International Conference on Telecommunications and Multimedia, Jul. 30, 2012.

(Continued)

*Primary Examiner* — Feng Niu

(74) *Attorney, Agent, or Firm* — Micah Goldsmith; Fehmi Chebil; Micky Minhas

(57) ABSTRACT

Embodiments are directed to decoding incomplete video data. In one scenario, a computer system receives a piece of a frame (e.g. a video frame). The frame includes multiple frame pieces, where each frame piece is encoded so as to be individually decodable. The computer system decodes the received frame pieces while waiting for at least one additional frame piece to be received. Then, when a condition occurs indicating that the frame is incomplete, the computer system synthesizes frame pieces to replace the additional frame piece that has not yet been received.

20 Claims, 7 Drawing Sheets

(56) References Cited

OTHER PUBLICATIONS

Wang, et al., "Error Resilient Video Coding Techniques", In IEEE Signal Processing Magazine, vol. 17, Issue 4, Jul. 2000, 22 pages.

Schaar, et al., "Unequal Packet Loss Resilience for Fine-Granular-Scalability Video", In IEEE Transactions on Multimedia, vol. 3, Issue 4, Dec. 2001, 14 pages.

"International Search Report & Written Opinion Received for PCT Application No. PCT/US2015/022599", Mailed Date: Jun. 25, 2015, 12 Pages.

Chiew, et al., "Error-Resilient Low-Delay H.264/802.11 Transmission via CrossLayer Coding with Feedback Channel", In Proceeding of the Visual Communications and Image Proceessing, Jul. 12, 2005, pp. 1868-1879.

Wenger, Stephan, "H.264/ AVC Over IP", In IEEE Transaction on Circuits and System for Video Technology, vol. 13, Issue 7, Jul. 2003, pp. 645-656.

Wang, et al., "Error Control and Concealment for Video Communication: A Review", In Proceedings of the IEEE, vol. 86, Issue No. 5, May 1998, pp. 974-997.

Second Written Opinion Issued in PCT Application No. PCT/US2015/022599, Mailed Date: Feb. 9, 2016, 5 Pages.

\* cited by examiner

DECODING AND SYNTHESIZING FRAMES FOR INCOMPLETE VIDEO DATA

BACKGROUND

Video data is routinely transmitted over the internet and other networks to consumers all over the world. The video data is typically sent using protocols that allow for or compensate for video frame data packet loss. For example, video frames encoded using the H.264 format may be transmitted using multiple different pieces or "slices", each of which may include multiple frame data packets. These packets may get lost during transmission or may be delayed for various reasons. If frame data for a given frame remains unreceived for certain amount of time, the frame is thrown away, resulting in a loss of visual fidelity which may be noticeable by a video consumer.

BRIEF SUMMARY

Embodiments described herein are directed to decoding incomplete video data. In one embodiment, a computer system receives a piece of a frame (e.g. a video frame). The frame includes multiple frame pieces or "slices", where each frame piece is encoded so as to be individually decodable. The computer system decodes the received frame pieces while waiting for at least one additional frame piece to be received. Then, when a condition occurs indicating that the frame is incomplete, the computer system synthesizes frame pieces to replace the additional frame piece that has not yet been received.

In another embodiment, in response to receiving pieces of a frame, a computer system decodes the received frame pieces while waiting for other frame pieces to be received. The computer system detects the occurrence of a condition indicating that the frame is incomplete, the frame having at least one additional frame piece still to be received. Then, in response to detecting the occurrence, the computer system synthesizes frame pieces to replace those additional frame pieces yet to be received.

In another embodiment, a computer system accesses a frame piece from a frame that includes multiple frame pieces. Each frame piece is individually decodable. The computer system decodes the accessed frame pieces while waiting for an additional frame piece to be received. The computer system then determines that at least one additional frame piece is yet to be received and, in response to the determination, synthesizes frame pieces using frame data associated with previous frames.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to decoding incomplete video data. In one embodiment, a computer system receives a piece of a frame (e.g. a video frame). The frame includes multiple frame pieces, where each frame piece is encoded so as to be individually decodable. The computer system decodes the received frame pieces while waiting for at least one additional frame piece to be received. Then, when a condition occurs indicating that the frame is incomplete, the computer system synthesizes frame pieces to replace the additional frame piece that has not yet been received.

In another embodiment, in response to receiving pieces of a frame, a computer system decodes the received frame pieces while waiting for other frame pieces to be received. The computer system detects the occurrence of a condition indicating that the frame is incomplete, the frame having at least one additional frame piece still to be received. Then, in response to detecting the occurrence, the computer system synthesizes frame pieces to replace those additional frame pieces yet to be received.

In another embodiment, a computer system accesses a frame piece from a frame that includes multiple frame pieces. Each frame piece is individually decodable. The computer system decodes the accessed frame pieces while waiting for an additional frame piece to be received. The computer system then determines that at least one additional frame piece is yet to be received and, in response to the determination, synthesizes frame pieces using frame data associated with previous frames.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
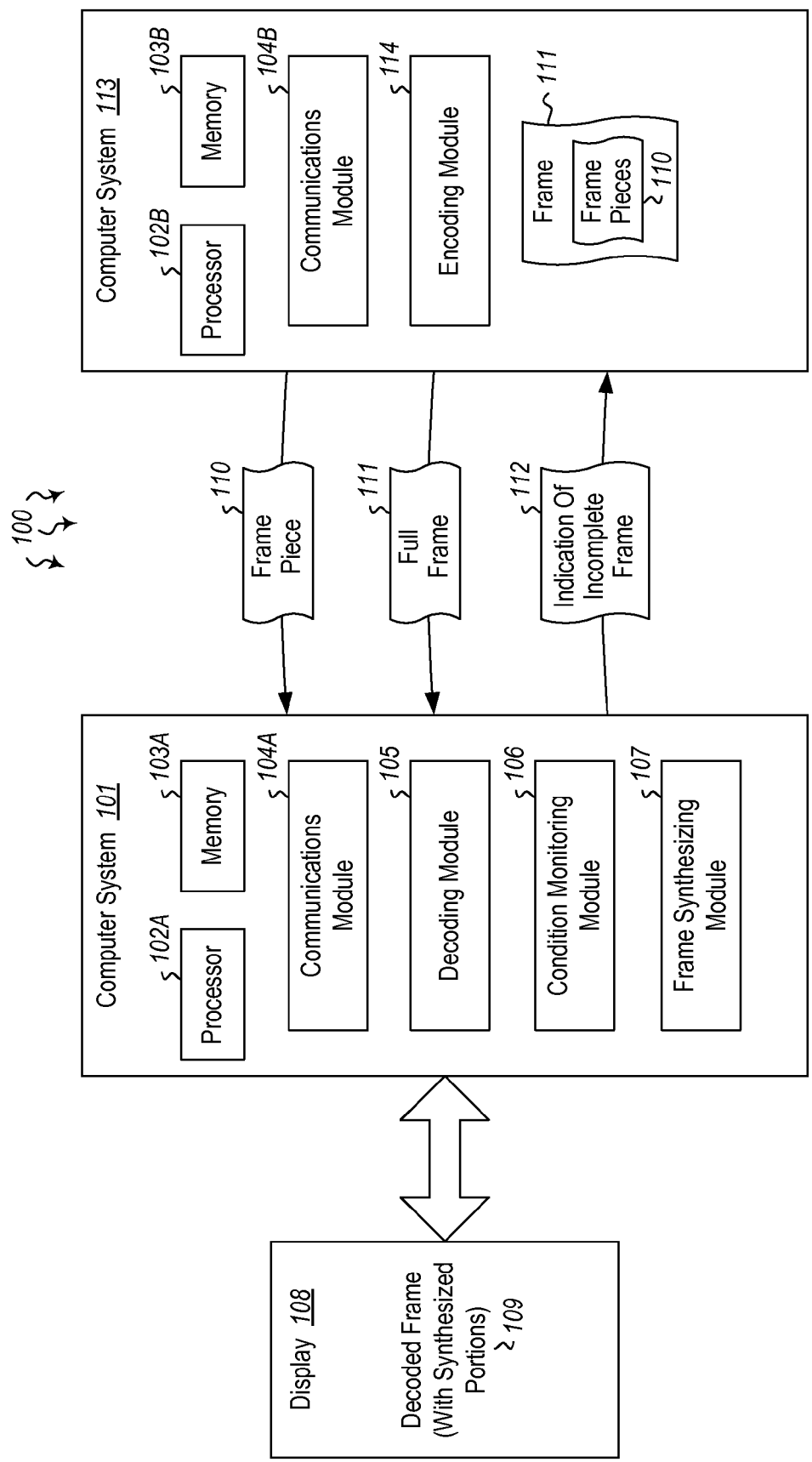
FIG. 1 illustrates a computer architecture in which embodiments described herein may operate including decoding incomplete video data.

As illustrated in FIG. 1, a computing system 101 typically includes at least one processing unit 102A and memory 103A. The memory 103A may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103A of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103A. The system memory may also be referred to as "main memory", and includes memory locations that are addressable by the at least one processing unit 102A over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer systems 101 and 113 may be any type of local or distributed computer systems, including cloud computing systems. Each includes at least one processor 102A/102B, memory 103A/103B and a communications module 104A/104B. The communications module may include wired or wireless communication means including wired or wireless network cards, Bluetooth wireless radios, Wifi radios or other hardware configured to transmit and/or receive digital data. The communications module 104A, for example, may receive frames 111 or frame pieces 110 from the communications module 104B of computer system 113.

In some embodiments, computer system 113 may be a server. The server may be a single computer system, or may be distributed. The server may be configured to provide data to clients such as computer system 101. The server may provide application data to clients in response to input or other requests for data. In some cases, the computer system 113 may be a video game server. In such cases, the video game server may be configured to provide frames with video game content. These frames may be encoded or, at least in some cases, may be in raw form. The frames may be sent in full frame form 111 or in pieces 110. The pieces may be sent via data packets, and each piece may include one or more data packets. As such, frame pieces are transferred to computer system 101 and are then combined to form a full frame. These frame pieces may be sent in a continuous streaming manner in order to form a contiguous series of frames to form a motion picture. In the gaming scenario, this stream of frames would form a video game output. It should be understood that the video game embodiment, while referred to frequently herein, is merely one example of an embodiment where video content is transferred (i.e. streamed) from one computer system to another. Indeed, the decoding of incomplete data, as described below, may implemented in a variety of different scenarios where video data is sent over a lossy network.

In order to make the frames 111 and frame pieces 110 easier to transfer, they are often encoded in some manner prior to transfer. In some embodiments, the frames may be encoded according to the H.264 format. In other embodiments, other formats may be used. The encoding module 114 of computer system 113 may encode the full frames and/or frame pieces 110 according to the selected encoding format. These encoded frames or frame pieces are then transferred to the computer system 101 where they are then decoded and displayed on display 108. The decoding module 105 decodes the received frames 111 and frame pieces 110 and sends them to display 108 for display to a user. In some embodiments, the decoding module 105 may be configured to display frame pieces 110, even when some of the frame pieces are missing. Indeed, in a network transaction where data packets are lost, some of the frame pieces or some portions thereof may be lost or may be delayed during transfer. In such cases, the decoding module will keep decoding the frame pieces 110 it has received while waiting for the lost or delayed pieces to show up. If the lost or delayed pieces do not show up in time, the frame synthesizing module 107 may synthesize the frame piece using a variety of different frame synthesis techniques.

For instance, the frame synthesizing module 107 may synthesize a lost or delayed frame piece by looking at frame data for one or more previous frames. The frame synthesizing module 107 may determine that the missing frame piece is in the top left corner of the frame that is currently being decoded and prepared for display. The frame synthesizing module 107 may then look at the frame data for the top left corner of one or more previous frames to ascertain what that portion of the frame looked like (e.g. was it blue sky, or a city background, etc.). Then, based on this data, the frame synthesizing module 107 may synthesize the missing frame piece(s) so that the frame looks substantially accurate. However, there will likely be some loss in fidelity. At this point the computer system 101 may send an indication 112 to computer system 113 indicating that at least one frame piece was lost or substantially delayed, and that a full frame 111 is to be sent. Then, instead of sending frame deltas (i.e. just sending portions of the frame that have changed), a full frame 111 will be sent or some other refresh will be performed to correct the incorrect pixels. It should be noted that many different methods and techniques may be used to synthesize missing frame pieces. These frame synthesis methods and other concepts will be described further below with regard to methods 200, 300 and 400 of FIGS. 2, 3 and 4, respectively.

Figure 2:
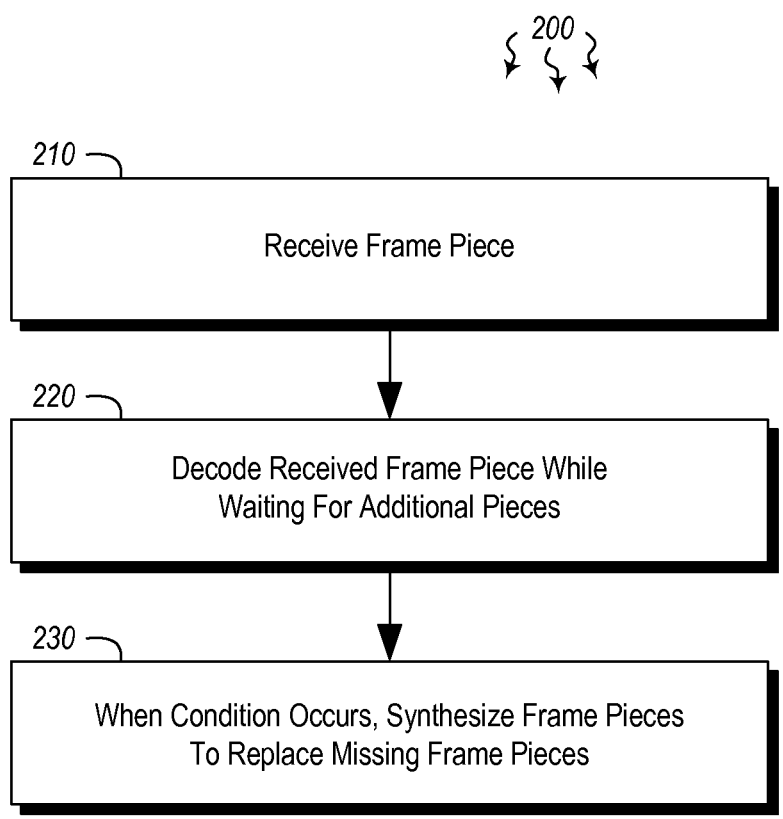
FIG. 2 illustrates a flowchart of an example method for decoding incomplete video data.
Figure 3:
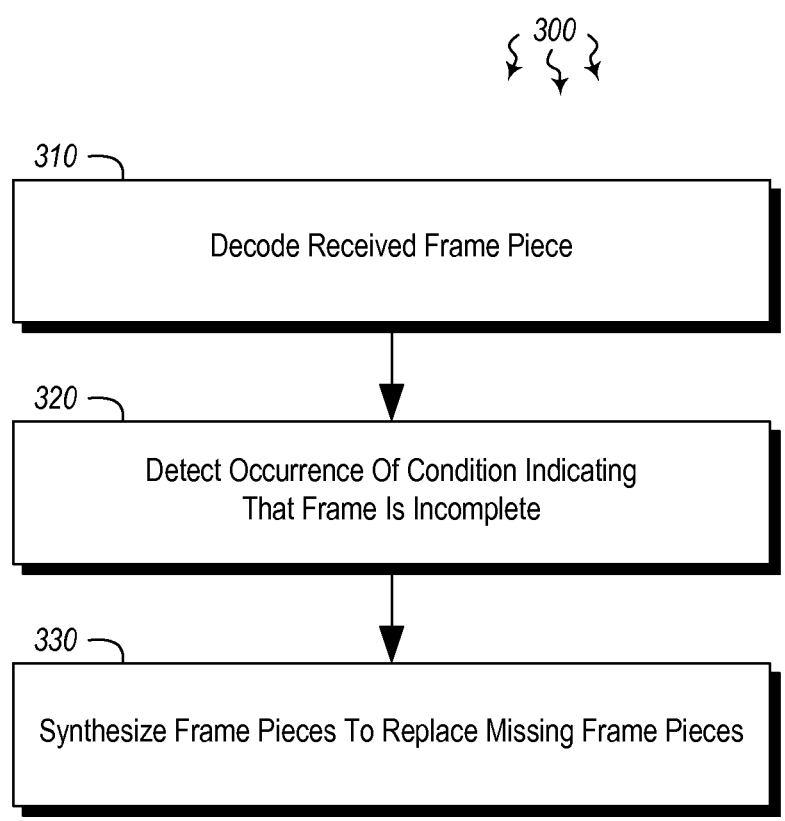
FIG. 3 illustrates a flowchart of an alternative example method for decoding incomplete video data.
Figure 4:
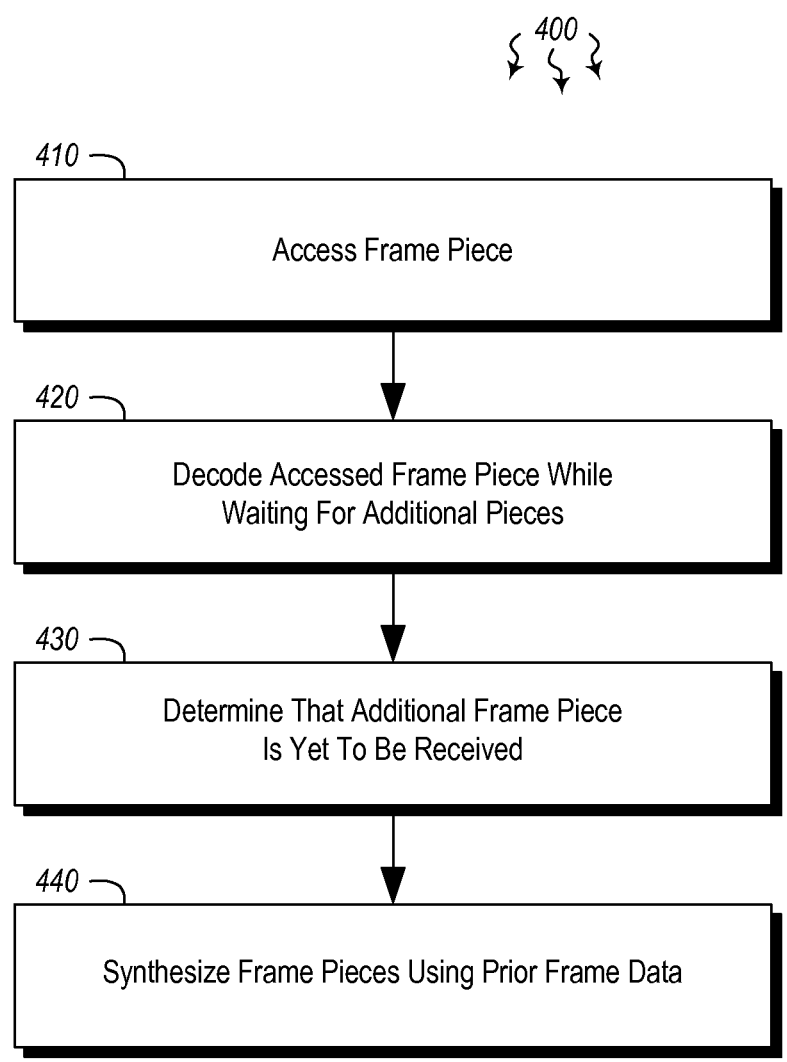
FIG. 4 illustrates a flowchart of another alternative example method for decoding incomplete video data.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for decoding incomplete video data. The method 200 will now be described with frequent reference to the components and data of environment 100.

Method 200 includes an act of receiving at least one piece of a frame, the frame including a plurality frame pieces, each frame piece itself being encoded so as to be individually decodable (act 210). For example, communications module 104A of computer system 101 may receive frame piece 110 from communications module 104B of computer system 113. The frame piece 110 may be sent alone, or in combination with other pieces. Moreover, the frame piece itself may be sent in a single data packet, or may be broken up into a plurality of data packets. The frame piece 110 is one piece of a full frame (e.g. 111) and, as such, forms a full frame when combined with its other corresponding frame pieces. Frames may be divided into substantially any number of frame pieces. These pieces are then transferred and reassembled to form the full frame. In some embodiments, the frame pieces may be encoded by encoding module 114 before transfer to computer system 101. The frames may be encoded in any of a variety of different encoding formats. These encoding formats may be optimized for video quality, transfer efficiency (i.e. bandwidth), quick decoding or for some other consideration.

Each frame piece 110 may be individually encoded in a manner that allows the frame piece to be individually decoded. Thus, the decoding module 105 of computer system 101 may receive a frame piece and decode it without having received any other frame pieces. Then, after receiving another frame piece, and while waiting for other frame pieces to be received, the decoding module 105 may begin decoding the recently received piece. Indeed, this is described in method 200, which includes an act of decoding at least one of the received frame pieces while waiting for at least one additional frame piece to be received (act 220). This process is further illustrated in FIG. 5.

Figure 5:
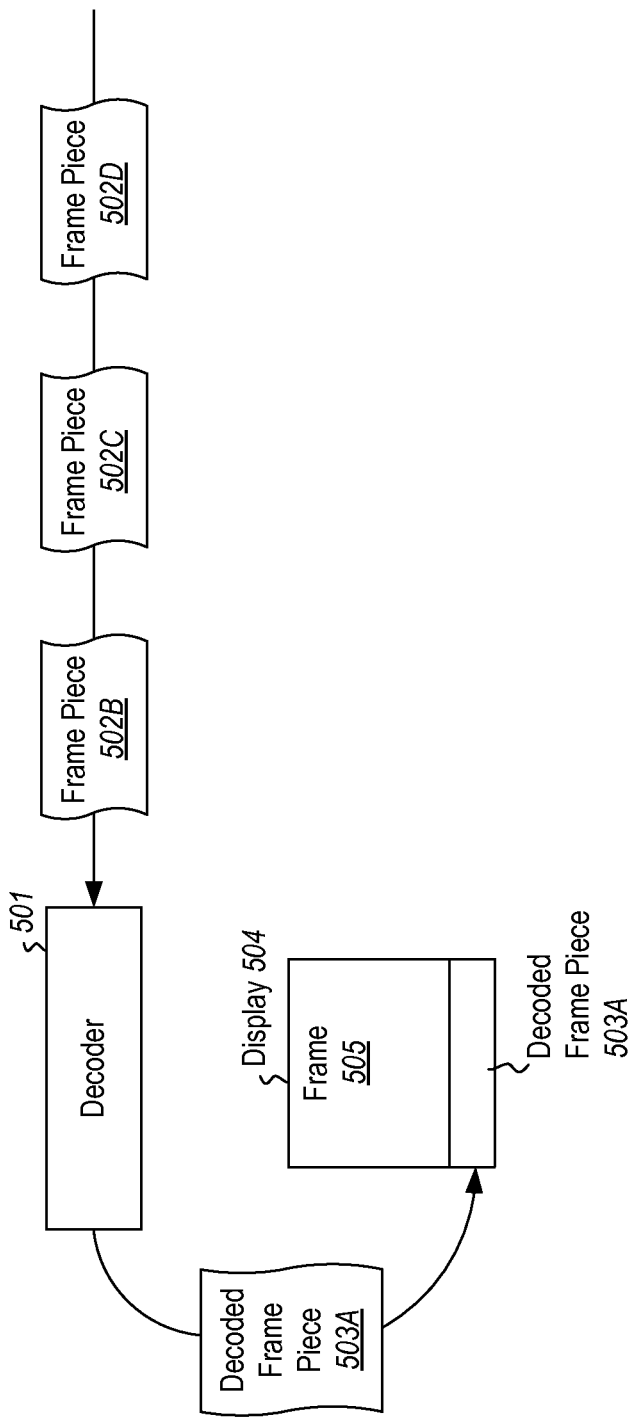
FIG. 5 illustrates an embodiment in which frame pieces are decoded in a sequential manner.
Figure 6:
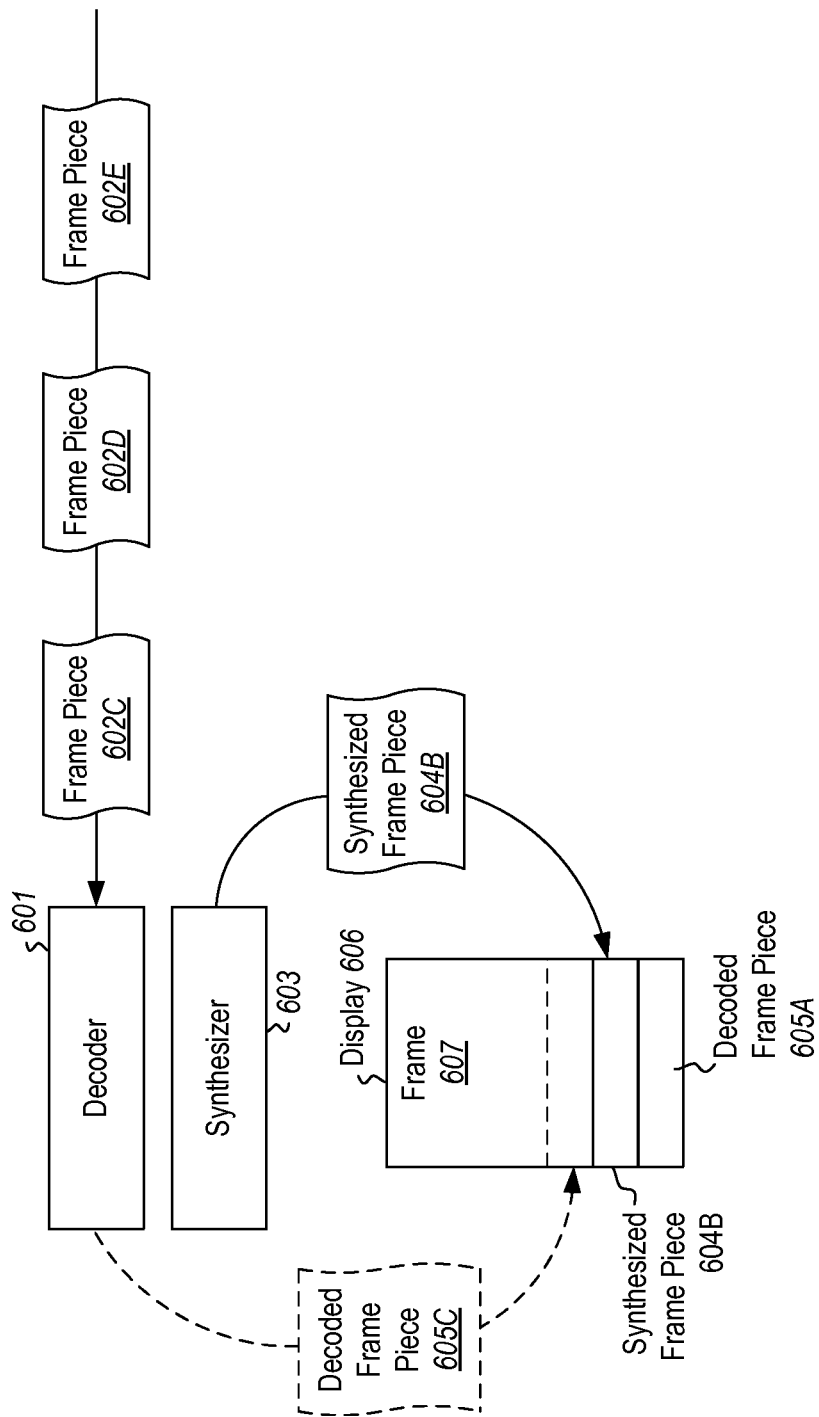
FIG. 6 illustrates an embodiment in which frame pieces are decoded and synthesized.

FIG. 5 includes a decoder 501 which may the same as or different than decoding module 105 of FIG. 1. The decoder 501 may have previously received frame piece 503A and may have already begun decoding it. This decoded frame piece 503A may be added to or may otherwise begin forming frame 505. While shown as forming the bottom portion of frame 505, it will be understood that the decoded frame piece 503A may include frame data from substantially any portion of the frame, and may include frame data from a single block in the frame, or may include frame data from different parts of the frame. For simplicity's sake, however, the frame pieces in FIGS. 5 and 6 are shown as stacking on top of each other horizontally. The incoming frame pieces 502B, 502C and 502D are shown in FIG. 5 as being in transit, and have not yet been received by the decoder 501. However, as these frame pieces are received, the decoder 501 can begin decoding them individually. Thus, received frame piece 503A can be decoded while waiting for frame piece 502B to be received. Similarly, frame piece 503B can be decoded while waiting for frame piece 502C to be received, frame piece 503C can be decoded while waiting for frame piece 502D to be received, and so on. In this manner, the decoder 501 can use the frame data it currently has to begin the decoding process.

Frame pieces can also be decoded out of order. The frame pieces are typically transferred over lossy networks, and may be transferred using protocols that do not guarantee the safe transmission of each packet (e.g. UDP). Thus, frame pieces may be lost or delayed for various reasons. In one example, frame piece 502C may be received before frame piece 502B. In such a case, the decoder 501 may begin decoding frame piece 502C before it receives frame piece 502B. Then, upon receiving frame piece 502B, it will be decoded and added to the frame 505. Finally, upon receiving all of the component pieces of the frame 505, the frame will be displayed in display 504. The display may be any type of monitor, television, tablet or display means. The frame 505 may be one frame in a series of frames. For example, in a streaming video or video game scenario, a data streaming server would likely send many such frames each second. These frames would then be displayed sequentially on display 504 to form a motion picture which would be viewable by a user.

Returning to FIG. 2, upon the occurrence of at least one condition indicating that a frame is incomplete, method 200 includes an act of synthesizing one or more frame pieces to replace the at least one additional frame piece yet to be received (act 230). The condition may include, for example, determining that one or more frame pieces are lost or delayed. The condition monitoring module 106 may be configured to monitor incoming frame pieces and may determine that a frame piece is lost or substantially delayed. Upon such a determination, the frame synthesizing module 107 may synthesize the missing frame piece and insert the synthesized data into the frame to complete the frame.

As illustrated in FIG. 6, decoded frame pieces may be combined with synthesized frame pieces to form a frame. Decoder 601 receives frame pieces as described above in relation to FIG. 5. As shown, frame 607 includes already-decoded frame piece 605A. Frame piece 605A may have been decoded while waiting for frame pieces 602B, 602C, 602D, 602E and so on. The condition monitoring module 106 of FIG. 1 may have determined that frame piece 604B was lost or delayed, and may have initiated the frame synthesizing module 107 (or synthesizer 603) to synthesize frame piece 604B. The synthesized data may be obtained in a variety of manners, as will be described further below with regard to FIG. 3. The synthesized frame piece 604B may be inserted into the frame 607 in the portion(s) where the actual frame piece would have been. The decoder 601 may continue decoding frame pieces while the synthesizer is synthesizing other frame pieces. Thus, frame piece 602C may be received and decoded, resulting in decoded frame piece 605C. Other frame pieces, such as 602D and 602E, may also be received and decoded while the synthesizer is synthesizing data for a missing or delayed frame piece.

Returning to FIG. 1, the condition monitoring module 106 may determine that a condition has occurred indicating the frame 111 is incomplete. This condition may include an indication that a specified minimum threshold number of frame pieces has been received, indicating that frame piece synthesis is to take place. Thus, for example, a minimum number of frame pieces may be established per frame or per series of frames. Once the minimum number of frame pieces has been reached, that frame may be deemed capable of correction via synthesis. As such, the frame includes enough received data that the re-creation (i.e. synthesis) of the remaining frame pieces is permissible. This minimum number of frame pieces may be set by an administrator, programmer or other user.

In cases where the minimum number of frame pieces has not been received, or in cases where synthesis is not possible or not desirable (e.g. too many artifacts would result), the computer system 101 may generate an indication 112 indicating that that frame replacement data is to be sent. At least in some embodiments, the frame replacement data is a full frame (e.g. 111). The indication 112 is sent to computing system 113 and it responds by sending a full frame 111. This received frame data may be incorporated into an existing frame (if frame pieces were sent) or may be incorporated as a full frame.

Thus, as described in method 200 of FIG. 2, video frame information may be used to determine what to do when low-level packet loss is detected, and in such situations, minimize decode latency and visual corruption when data is missing. Embodiments process low-level data packets coming in over a network, track and group the data packets by frame and frame piece, and feed the grouped frame pieces to the decoding module 105 while waiting for other frame data packets to arrive. If data packets from a frame piece cannot be recovered via error correction, partial frame pieces are either completed or replaced by synthesized data that minimizes visual corruption until a refresh can be performed (i.e. a full frame 111 is sent). This further allows the use of video decoders that don't have robust error concealment by supplying them valid data.

Indeed, in some embodiments, computer system 101 may determine that at least one of the received frame pieces 110 includes forward error correction data. This forward error correction (FEC) data may then be implemented to fix errors in the frame piece and ultimately use that frame piece to form a frame. In such cases, the frame piece may be decoded before forward error correction is initiated. In other embodiments, the computer system 101 may be configured to wait for FEC information for the frame that had an unreceived frame piece, while continuing to decode those frame pieces that are complete. Thus, the decoding module 105 may continue to decode frame pieces, even while waiting for FEC data on those frame pieces that have incomplete or corrupt data (e.g. due to lost or corrupted data packets). Then, when the FEC data is received for that frame piece to which the FEC information corresponds, the decoding module 105 may decode the FEC-corrected frame piece and combine that frame piece with the others to form a decoded frame 109. This frame may then be displayed on display 108.

Figure 7:
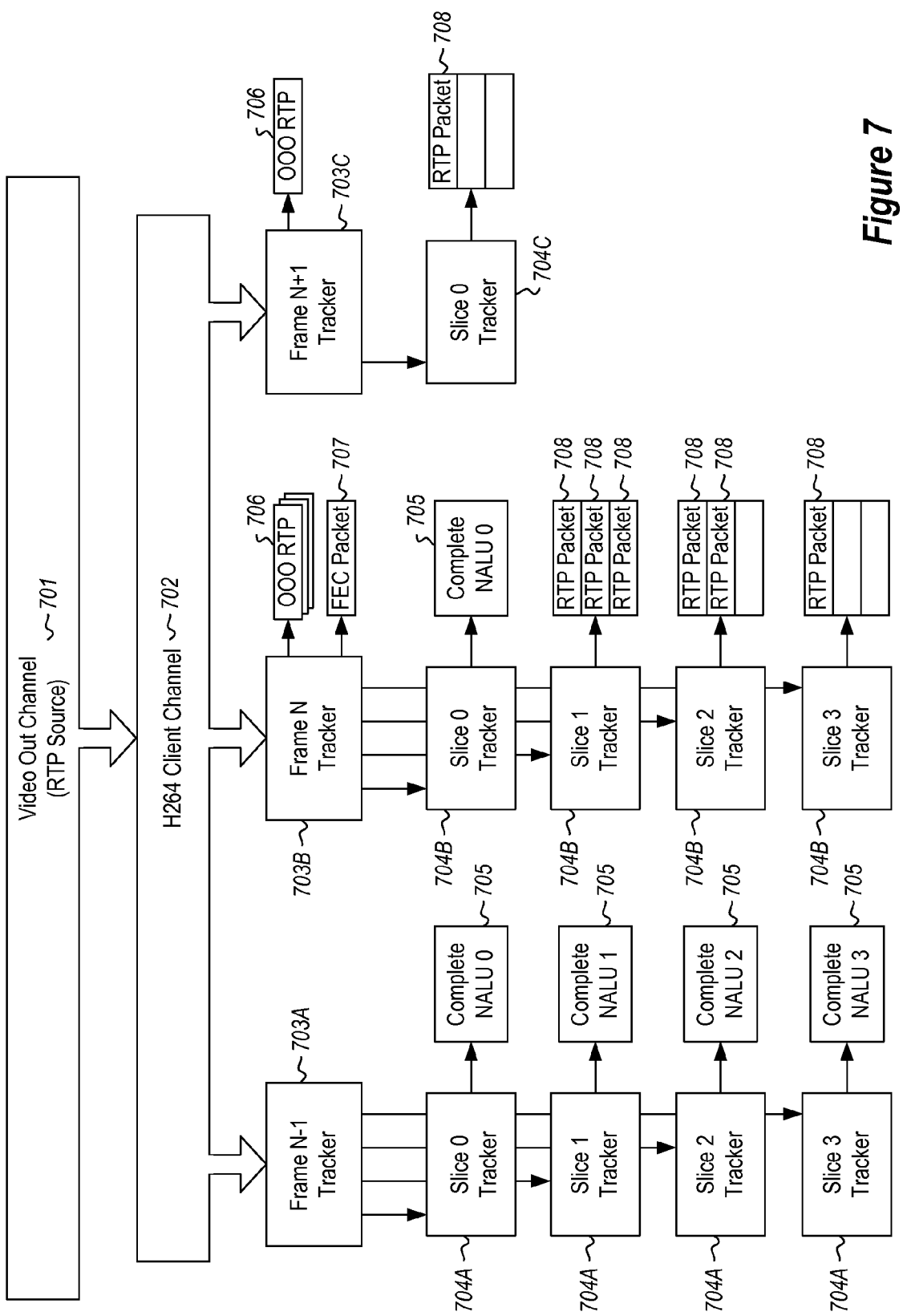
FIG. 7 illustrates an embodiment in which frame pieces are decoded in an H.264 channel.

FIG. 7 illustrates an embodiment that implements the H.264 format. While this format is used, it will be understood that other formats may also be used with similar techniques. Frame data packets may be tracked across multiple frames. This results in tracking information which indicates to the computer system 101 that, for example, an earlier frame should have been completed, and that any missing packets will likely not arrive and are to be considered dropped packets. The H.264 channel 702 of FIG. 7 uses frame tracker objects 703A, 703B and 703C to track known frames currently in progress along with data packets associated with a frame. These data packets are received from a video out channel 701 or other streaming sources (e.g. real-time transport protocol (RTP) sources). Frame pieces (or "slices" as used herein) may be tracked by slice tracker objects 704A, 704B and 704C to track each of the in-progress slices for each frame. This allows the computer system 101 to know when a new frame is starting, how complete a previous frame is, which slices are complete or missing, when a frame needs forward error correction, etc.

The H.264 channel 702 may receive raw RTP data packets (or data packets of another protocol) from the video out channel 701 without any preprocessing. Based on timestamp, the frame data packets are either fed to an existing frame tracker object (e.g. 703A) if available or a newly created one (e.g. 703C). A frame data packet's payload is analyzed when received by the frame tracker, and if the frame data packet contains the start of a slice network abstraction layer unit (NALU), a new slice tracker (e.g. 704C) is created and added to the list. If the frame data packet (e.g. RTP packet 708) is the next in sequence for an existing slice, it is fed to the corresponding slice tracker. Otherwise, the frame data packet is held in an out-of-order (ooo) packet list (e.g. 706), or ignored if it's a duplicate. If a packet contains forward error correction (FEC) data (e.g. 707), it is either used immediately to recreate a dropped packet (in some cases, when only one packet is missing), or is held by the frame tracker for later use when more packets have arrived.

At least in some embodiments, when a frame data packet is fed to a slice tracker (e.g. 704A), the frame data packet can be assumed to be in correct sequence order. Once the last frame data packet of the slice is received, the slice NALU (e.g. 705) can be sent to a video decoder (e.g. 105 of FIG. 1).

If the slices (e.g. frame pieces 110) for a given frame 111 have been completed and sent to the decoder (e.g. 105), the frame is considered complete (e.g. 705) and the channel can forward it for display on display 108. When the frame and one or more of its slices are not complete when data for the next frame begins to arrive, the computer system 101 may determine that frame data has been dropped that cannot be recreated via error correction. In such cases, frame piece synthesis occurs in order to conceal the errors caused by the incomplete frame data. The missing frame pieces are synthesized by frame synthesizing module 107 so that the decoding module 105 can finish processing the frame. In the H.264 embodiment described in FIG. 7, for each missing slice, a synthesized slice NALU is built that copies pixels from the previous reference frame. The synthesized slice NALU is sent to the decoder 105 for decoding. Subsequent complete slices are also sent to form the frame. This yields a complete output frame in cases where frame data is incomplete or corrupt.

If the corrupted frame (i.e. the decoded frame with synthesized portions 109) is not referenced by any later frames, then it can be displayed in display 108 and then the next frame handled normally. The frame data corruption may be visible, but only for a single frame time and will not propagate to later frames. Or, if the corruption or other data loss is significant enough, the frame can be dropped completely and not displayed at all. If the corrupted frame is a reference frame (e.g. a P-frame in the h.264 format), its corruption will be propagated to later frames (indeed, any frame used as the basis for later frames will have its corruption propagated). In such cases, the corrupted frame is displayed but the video source is notified via the video out channel 701 that data loss has occurred. This allows the video provider (e.g. computer system 113 of FIG. 1) to immediately trigger are fresh, quickly cleaning up the corruption (in some cases, in the next second or two).

Turning now to FIG. 3, a flowchart is illustrated of a method 300 for decoding incomplete video data. The method 300 will now be described with frequent reference to the components and data of environment 100.

Method 300 includes, in response to receiving one or more pieces of a frame, an act of decoding the received one or more pieces while waiting for at least one additional frame piece to be received (act 310). For example, communications module 104A of computer system 101 may receive frame pieces 110 which, when combined, form a full frame 111. While waiting for additional frame pieces to be received, the decoding module 105 may begin decoding those frame pieces it has received, even if those frame pieces are not in order. The condition monitoring module 106 may detect the occurrence of a condition indicating that the frame is incomplete, in that the at least one additional frame piece is yet be received (act 320). The condition could be a determination that frame data for a frame piece has not yet been received, or that a full frame piece has not been received. Additionally or alternatively, the condition could be receiving at least one piece of a subsequent frame, or making a determination that frame data for a given piece is corrupt or is otherwise unusable.

In response to this act of detecting, the frame synthesizing module 107 may synthesize frame pieces to replace those additional frame pieces yet to be received (act 330). The synthesizing may occur in a variety of different manners, each different method, however, resulting in a synthesis or re-creation of missing or corrupt data. In some cases, synthesizing frame pieces to replace those frame pieces yet to be received includes synthesizing frame pieces using frame data associated with a previous frame. In such cases, the frame synthesizing module may access and analyze one or more previously complete frames to determine how the pixels looked in the portions where the frame data in the current frame is missing or corrupt. Using this information, the frame synthesizing module 107 may create frame data that is similar to or the same as the frame data that appeared in the previous frames.

Going further, the frame synthesizing module 107 may take into account various factors including determining prior movement between frames. The prior movement between frames may be an indicator as to how the data should keep changing in the frame that is being synthesized. Moreover, the frame synthesizing module 107 may determine which direction a camera is panning based on one or more previous frames, and may synthesize the frame pieces using the determined panning direction. Thus, if the camera is determined to be panning from left to right, the frame synthesizing module 107 may determine that pixels that were previously on the right side of the frame will be moved progressively closer to the left side of the frame. Other factors including motion vectors may be used to determine erratic movements (as opposed to progressive left-to-right or top-to-bottom pans) or provide other indicators as to what the current frame (i.e. the frame that is to be synthesized) should look like. Using this information, the frame synthesizing module 107 can approximate or otherwise synthesize the missing frame data for a frame piece, which is then combined with the previously decoded frame pieces to form a complete frame 111.

FIG. 4 illustrates a flowchart of an alternative method (method 400) for decoding incomplete video data. The method 400 will now be described with frequent reference to the components and data of environment 100.

Method 400 includes an act of accessing at least one piece of a frame, the frame including one or more frame pieces, where each frame piece is individually decodable (act 410). Decoding module 105 may access one or more received frame pieces 110 and decode those frame pieces while waiting for at least one additional frame piece to be received (act 420). Condition monitoring module 106 may determine that at least one additional frame piece is yet to be received, rendering the frame incomplete (act 430). Then, in response to the determination, the frame synthesizing module synthesizes frame pieces using frame data associated with at least one previous frame (act 440). The frames and frame pieces may be tracked separately, as generally shown in FIG. 7. By tracking frame piece data packets across multiple frames, computer system 10 may determine when data packets are received for the subsequent frame. When a data packet is received for a subsequent frame, this may be an indication or a condition that causes frame synthesis to be initiated.

In some embodiments, the frame piece tracking and/or frame tracking may be implemented using a protocol-based sequence number, using an incrementally-increasing timestamp, or using some other type of identifier. A protocol-based sequence number or incrementally-increasing timestamp may be assigned to each frame and/or each frame piece. This allows the frame or frame piece to be tracked individually and, consequently, to alert the computer system 101 when frame data for a new frame piece or frame has been received. For instance, the frames and/or frame pieces may be received as part of a streamed video game. Streamed video games typically run at a high frame rate to ensure that the user does not experience lag. In such scenarios, the computer system 101 may use the protocol-based sequence number or incrementally-increasing timestamp to quickly determine whether a frame or frame piece is incomplete, and whether portions of that frame need to be synthesized. If it is incomplete (e.g. the timestamp information used to associate frame piece data packets with frame pieces and/or frames indicates that a new frame is being received), the frame synthesizing module can immediately being synthesizing the missing or corrupt frame data. In this manner, the frame can be quickly completed and sent to the display 108 for display to the game player.

Accordingly, methods, systems and computer program products are provided which decode incomplete video data. Frame pieces can be decoded while waiting for other pieces of a frame. Moreover, if any portion of frame data is determined to be missing or corrupt, that portion of the frame can be synthesized to approximate what the missing or corrupt data would have looked like.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. At a computer system including at least one processor and a memory, a computer-implemented method for decoding incomplete video data, the method comprising:
    receiving at least one first portion of a first frame, the first frame including a plurality of frame portions, each frame portion of the first frame individually being encoded so as to be individually decodable;
    decoding the at least one first portion prior to receiving at least one second portion of the first frame;
    based at least on an occurrence of at least one condition prior to receiving the at least one second portion, the at least one condition associated with the at least one second portion, synthesizing at least one replacement portion of the first frame for the at least one second portion;
    displaying a corrupted version of the first frame, the corrupted version of the first frame including the at least one first portion and the replacement portion;
    sending a notification to a second computing system to trigger a refresh of the first frame to receive a second frame;
    receiving the second frame from the second computing system; and
    using the second frame in place of the corrupted version of the first frame in one or more later frames that use the first frame as a reference frame.

2. The method of claim 1, wherein the at least one condition comprises a determination that the at least one second portion is lost or delayed.

3. The method of claim 1, further comprising an act of combining the decoded at least one first portion of the first frame and the one or more synthesized frame pieces to form a frame.

4. The method of claim 1, further comprising:
    determining a received portion of the first frame includes forward error correction data; and
    implementing the forward error correction data to generate a frame.

5. The method of claim 1, further comprising waiting for forward error correction information for the first frame, while continuing to decode frame portions that are complete.

6. The method of claim 5, further comprising:
    receiving forward error correction information for the first frame; and
    decoding a frame portion to which the forward error correction information corresponds.

7. The method of claim 1, wherein the at least one condition comprises an indication that a specified minimum threshold number of frame portions has been received, indicating that synthesizing the at least one replacement portion of the first frame is to take place.

8. The method of claim 1, wherein synthesizing at least one replacement portion of the first frame for the at least one second portion comprises synthesizing one or more frame portions using at least a portion of frame data associated with at least one previous frame.

9. The method of claim 1, further comprising, determining that the first frame is a reference frame, and Wherein sending a notification to a second computing system to trigger a refresh of the first frame to receive a second frame is performed as a result of determining that the first frame is a reference frame.

10. A computer system comprising the following:
one or more processors;
system memory; and
one or more computer-readable storage media having stored thereon computer-executable instructions that, when executed by the one or more processors, cause the computing system to perform a method for decoding incomplete video data, the method comprising the following:
in response to receiving at least one first portion of a first frame, decoding the received at least one first portion of the first frame prior to receiving at least one second portion of the first frame;
detecting the occurrence of at least one condition prior to receiving the at least one second portion, the at least one condition associated with the at least one second portion;
in response to detecting, synthesizing at least one replacement portion of the first frame for the at least one second portion;
displaying a corrupted version of the first frame, the corrupted version of the first frame including at least one first portion and the replacement portion;
sending a notification to a second computing system to trigger a refresh of the first frame to receive a second frame;
receiving the second frame from the second computing system; and
using the second frame in place of the corrupted version of the first frame in one or more later frames that use the first frame as a reference frame.

11. The computer system of claim 10, wherein synthesizing e or more frame pieces to replace the at least one additional frame piece yet to be received comprises using at least a portion of information indicating prior movement between frames.

12. The computer system of claim 10, wherein synthesizing at least one replacement portion of the first frame for the at least one second portion comprises determining which direction a camera is panning based on one or more previous frames, and synthesizing the one or more frame portions using the determined panning direction.

13. The computer system of claim 10, wherein synthesizing at least one replacement portion of the first frame for the at least one second portion comprises using frame data indicating motion vectors.

14. The computer system of claim 10, wherein detecting the occurrence of at least one condition comprises receiving at least one portion of a subsequent frame.

15. The computer system of claim 14, further comprising tracking frame portion data packets across a plurality of frames to determine when data packets are received for the subsequent frame.

16. The computer system of claim 14, wherein timestamp information is used to associate frame portion data packets with frame portions and with frames.

17. A computer program product for implementing a method for decoding incomplete video data, the computer program product comprising one or more computer-readable storage media having stored thereon computer-executable instructions that, when executed by one or more processors of the computing system, cause the computing system to perform the method, the method comprising:
accessing at least one piece of a frame, the frame including one or more frame pieces, where each frame piece is individually decodable;
decoding the at least one accessed frame pieces while waiting for at east one additional frame piece to be received;
determining that at least one additional frame piece is yet to be received, rendering the frame incomplete;
in response to the determination, synthesizing one or more frame pieces using at least a portion of frame data associated with at least one previous frame
displaying a corrupted version of the first frame, the corrupted version of the first frame including the at least one first portion and the replacement portion;
sending a notification to a second computing system to trigger a refresh of the first frame to receive a second frame;
receiving the second frame from the second computing system; and
using the second frame in place of the corrupted version of the first frame in one or more later frames that use the first frame as a reference frame.

18. The computer program product of claim 17, wherein frames and frame portions are tracked separately using at least one of a protocol-based sequence number and an incrementally-increasing timestamp.

19. The computer program product of claim 17, wherein the frames are received as part of a streamed video game.

20. A computer-implemented method performed by a computing system which includes a memory containing computer-executable instructions which, when executed by one or more processors of the computing system, perform a me for decoding incomplete video data, the computer-implemented method comprising:
accessing at least one first portion of a first frame contained in video data, the first frame including a plurality of frame portions that are each individually decodable;
decoding the at least one accessed first portion of the first frame prior to receiving at least one second portion of the first frame;
determining that the first frame is incomplete by determining that the second portion of the first frame has not been received;
in response to the determination that the first frame is incomplete, synthesizing at least one replacement portion for the first frame using at least a portion of frame data associated with at leas previous frame;
displaying a corrupted version of the first frame, the corrupted version of the first frame including the at least one first portion and the replacement portion;
sending a notification to a second computing system to trigger a refresh of the first frame to receive a second frame;
receiving the second frame from the second comp system; and using the second frame in place of the corrupted version of the first frame in one or more later frames that use the first frame as a reference frame.

* * * * *